Nov. 4, 1941. J. H. HAYES 2,261,549
ARTIFICIAL LURE
Filed April 21, 1938
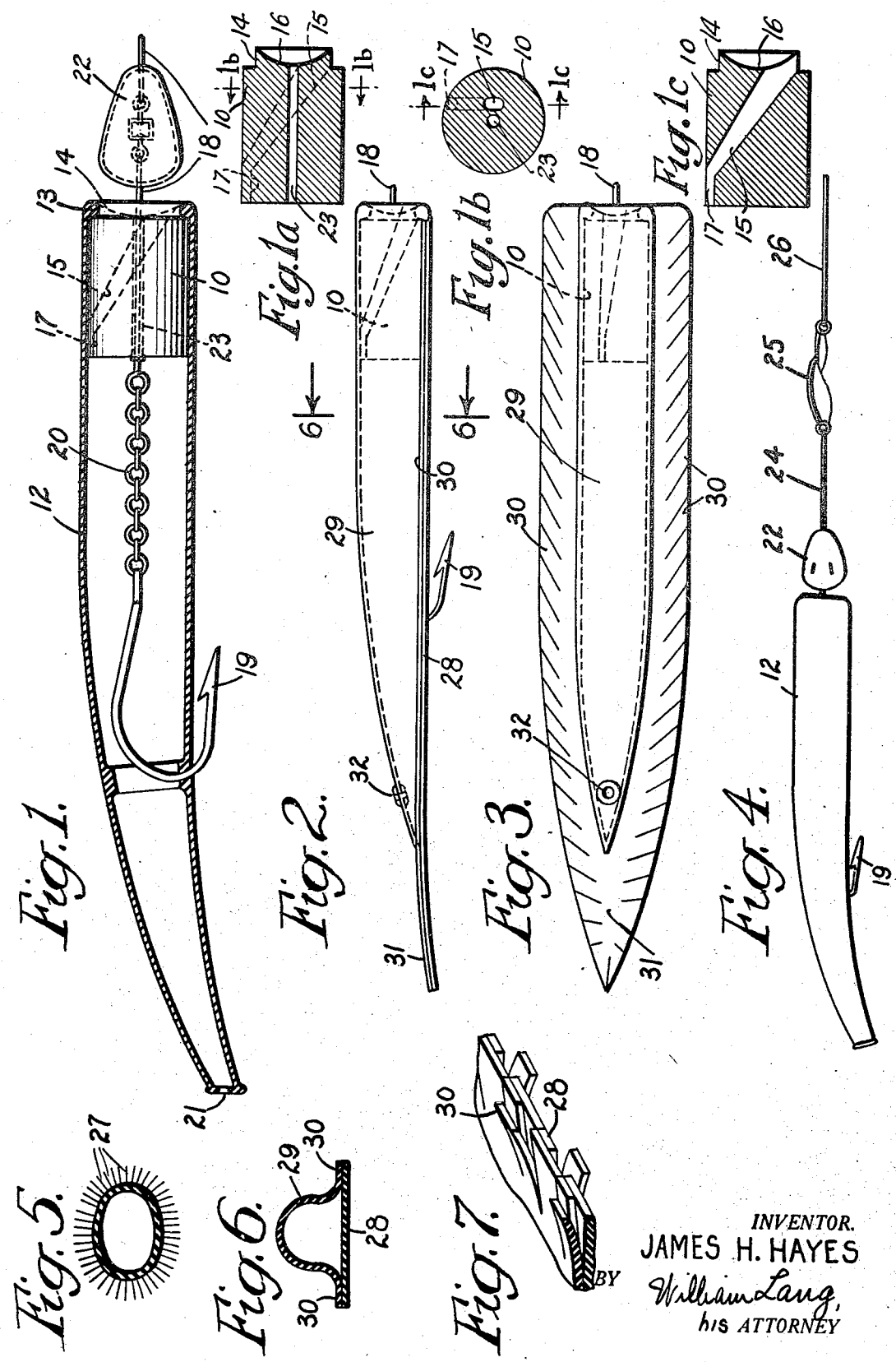
INVENTOR.
JAMES H. HAYES
BY William Lang,
his ATTORNEY Patented Nov. 4, 1941

2,261,549

UNITED STATES PATENT OFFICE 2,261,549

ARTIFICIAL LURE

James H. Hayes, New York, N. Y.

Application April 21, 1938, Serial No. 203,327

11 Claims. (Cl. 43—42)

This invention relates to an artificial fish lure and more particularly to an improved lure constructed to effect a movement which will attract fish thereto.

The invention constitutes an improvement over the lure shown and described in my copending application Serial No. 110,980, filed November 16, 1936. In such application there is shown an elongated envelope simulating the coloring and configuration of a headless eel-skin, in the open end of which is secured a stopper element with a passage to admit water into the interior of the envelope to inflate the same as it is drawn through the water. The envelope is formed symmetrically about its longitudinal axis and has a small opening at its tip in line with said axis through which the water exists. A second opening at a point intermediate the ends permits egress of water in a direction at right angles to the longitudinal axis and the back pressure at this opening causes deflection of the envelope from a straight line of travel as it is drawn through the water.

It is an object of the present invention to provide an eel-skin simulating envelope which by its own configuration permits discharge of water therefrom at its extremity and at an angle to the longitudinal axis of the envelope. The back pressure at the end, since it is the point most remote from the line will afford a more decided whip or deflection and will more readily attract the fish by causing the entire lure to swing in a greater arc as it is drawn through the water.

A further object of the invention is to provide a lure in accordance with the principles of my invention having the outboard configuration and appearance of a sand worm or blood worm.

A still further object of the invention is to provide an envelope in which extending feelers are formed integrally with the envelope to enhance its attractiveness as a lure.

Another object resides in the provision of a combinational form of lure in which the illusion is created of a small fish being pursued by a larger fish with the latter following a tortuous path in its pursuit.

Further objects of the instant invention reside in any novel feature of construction or operation or novel combination of parts present in the embodiment of the invention described and shown in the accompanying drawing whether within or without the scope of the appended claims and irrespective of other specific statements as to the scope of the invention contained herein.

In the drawing:

Fig. 1 is a longitudinal sectional view of the improved lure;

Fig. 1a is a sectional view taken on line 1a—1a of Fig. 1.

Fig. 1b is a sectional view taken on line 1b—1b of Fig. 1a.

Fig. 1c is a sectional view taken on line 1c—1c of Fig. 1b.

Fig. 2 is a side view of a different form of the improved lure;

Fig. 3 is a plan view of Fig. 2;

Fig. 4 is a view showing the combinational arrangement of the double lure;

Fig. 5 is a section of an oval-shaped form of sac;

Fig. 6 is a section on line 6—6 of Fig. 2;

Fig. 7 is a detail showing the feeler construction of the sac of Fig. 3.

Referring to the drawing, 10 represents the stopper cylinder which may be of metal for trolling or of buoyant material for surf casting over which the open end of the envelope or sac 12 is drawn. The envelope is preferably made of rubber having a terminal portion 13 in the form of an elastic band which snaps into place over the portion 14 of reduced diameter of the cylinder 10. The cylinder 10 has a single tapered hole 15 extending from the recess or spherical depression 16 to a coaxial slot 17, the hole lying to one side of a plane through the longitudinal axis of the cylinder. An axial opening 23 is provided to receive wire 18 to which is fastened a hook 19 by means of a chain 20. The barbed end of the hook extends through the envelope with a substantially close fit.

The configuration of the envelope 12 is substantially arcuate, as shown in Fig. 1, tapering toward its free end at which is an opening 21 reinforced as shown. Further reinforcement as by thickening the rubber is provided at the point at which the hook 19 pierces the envelope.

If desired, a head 22 may be secured in advance of the envelope and constructed as a swivel to further the illusion of a live eel. To form the head 22, a well known type of swivel 22a is connected in line 18 and over the same is placed a thin shell which might be made of two parts and secured to the center of the swivel in any suitable manner as, for example, by a rivet. As the cylinder and envelope are drawn along by wire 18, water will be scooped up by the depressed portion 16 and forced into opening 15 and will pass into the envelope 12 causing it to become inflated. The opening 15 by virtue of its location at an angle to the axis of cylinder 10 will cause the device to spin or rotate. At the same time, the back pressure of the water passing out of the envelope through hole 21 will force the entire envelope to swing across its line of movement and since it is rotating at the same time will be forced to swing back again, the entire effect being that of an object advancing with a rotary motion and at the same time zig-zagging through and across an orbit created by the deflecting free end. The resulting tortuous path through the water is in simulation of the movement of a live eel and as such enhances the natural allure of the device itself.

In Fig. 4 there is shown a combinational arrangement in which a line 24 extends from head 22 to a bright metallic spoon 25 to whose opposite end the main line 26 is attached. With this tandem arrangement, if due regard is had for the relative sizes of envelope 12 and spoon 25 used, a life-like illusion is created of a small fish being pursued by a larger, eel-like fish with the latter darting hither and yon on the heels of the former, thus attracting the attention of any live fish in the vicinity of the path through which the lure is drawn.

The envelope instead of being configured to represent an eel and having a cylindrical cross-section may be oval-shaped as represented in Fig. 5 and threads or fibers 27 may extend outwardly therefrom to simulate the appearance of a sand worm. For such purpose the stopper element 10 and the sac would be made of a smaller size. These threads 27 may be formed by molding the same of the same material as the envelope, for example, rubber, so that they are integral with the envelope itself and, by having to regard their length and thickness, a natural waving appearance will be obtained.

Another manner of constructing the sac may be to form the same of two pieces as in Figs. 2, 3 and 6 with a flat piece 28 to which is cemented a rounded portion 29 so configured that the open end will fit over the stopper element 10. This arrangement provides vane portions 30 extending along the sides of the sac which meet at the end to form a flat tail portion 31. In this case the outlet opening 32 is made as indicated in Figs. 2 and 3 to one side of the longitudinal axis of the line to produce the same manner of deflection as the main form shown in Fig. 1. That is, the hole 32 is located below a horizontal line extending through the center of the element 10 in line with wire 18. It is to be noted that the opening 32 is slightly to the right of the extremity of the envelope so that, when water passes through the envelope, there will be an entrapment of air in the extremity of the envelope at 32a which will impart a slight buoyancy to the lure at this point. This construction does not produce as violent a lateral movement as the eel-shaped lure but is more in the nature of a wriggling movement through the water.

The vanes 30 may be cut or slit at an angle as shown in Fig. 7 and then separated slightly to simulate feelers which are acted upon by the water as the lure is drawn along to give a rippling effect along the sides thereof. It will be understood, of course, that angle of the cuts made and their closeness of spacing is a matter of choice depending on the particular effect desired.

While there has been shown and described and pointed out the fundamental novel features of the invention as applied to a single modification, it will be understood that various omissions and substitutions and changes in the form and details of the device illustrated and in its operation may be made by those skilled in the art without departing from the spirit of the invention. It is the intention therefore to be limited only as indicated by the scope of the following claims.

What is claimed is:

1. An artificial lure simulating the appearance of an eel, comprising an open ended collapsible sac of substantially circular cross-section, and having its opposite end arched so that the extremity thereof lies to one side of the longitudinal axis of the sac, an element positioned within the open end of said sac, said element having an opening to freely admit water into the sac at an angle to the axis thereof to cause rotation of the sac, said free end having an opening at its extremity to permit restricted egress of water therefrom and means for drawing said element and sac through the water whereby the water passing through the same will inflate the sac and the water passing through the tip at an angle to the longitudinal axis will cause the sac to be deflected from a straight line of travel.

2. An artificial lure simulating the appearance of an eel comprising a rubber tube, tapered and arched at one end and having an opening at the tapered extremity lying substantially to one side of the longitudinal axis of the tube, an element positioned within and secured to the opposite open end of said tube, said element having an opening to freely admit water into the tube and an opening to permit a line to pass through, a fish-hook disposed within said tube and extending therethrough, and means for drawing said element through the water whereby the water passing into the element and out through the offset opening at the tapered extremity of the tube will cause the same to take a tortuous path.

3. A fishing lure comprising a hollow rubber-like tube having a lower wall adapted to be pierced to provide an opening only of sufficient size to sealingly surround a body portion of a hook to be extended from the interior of the tube to the exterior thereof, a large opening at the front end of the tube adapted to removably receive an anchoring means for the shank of the hook and a line, and an opening at the rear end of the tube of a smaller size than the opening at the front end and having the axis thereof in a plane other than the axis of the front end opening, whereby water entering the tube through the front end opening and passing from the tube through the rear end opening will cause a turning action of the tube about the axis of the front end opening, said rear end opening being solely a water discharging opening, said anchoring means being of the type having a biased passage therein, whereby water entering through the anchoring means will immediately be deflected toward one end wall thereof.

4. A fishing lure as defined in claim 3, wherein the upper surface of the rear portion thereof curves downwardly from the front to rear in a curve of one radius and the lower surface of that portion thereof curves downwardly in a curve of a larger radius, the upper curved surface merging into a forward curved portion and the lower curved portion merging into a forward straight portion.

5. The invention set forth in claim 3 in which the tube is formed of two parts, a flat section and a rounded section, the points of connection of the two parts forming a vane and tail section extending in the direction of the length of the tube.

6. The invention set forth in claim 3 in which the tube is provided with vanes extending from the sides thereof and a tail portion extending to the rear thereof.

7. The invention set forth in claim 3 in which the tube is provided with a serrated vane extending along its length in simulation of feelers which may be moved by the water as the tube is drawn therethrough.

8. A lure simulating the appearance of a fish or worm, comprising a tapering sac open at one end and closed at the other end, said sac being arched near its closed end and having a restricted opening spaced from said closed end lying substantially to one side of the longitudinal axis of the sac, whereby water passing through the sac will exit through said opening at an angle to the longitudinal axis of the tube and the space between the opening and the closed end will provide an air trap to render the said end buoyant.

9. A blood-worm-simulating sac for an artificial lure comprising a tapering rubber tube arched near one end and having an opening of restricted area at said arched end lying substantially to one side of the longitudinal axis of the sac, said tube being provided with a multiplicity of flexible feelers extending therefrom, whereby, as the lure is drawn along, the water passing through the sac will exit through said opening at an angle to the longitudinal axis of the tube.

10. An artificial lure simulating the appearance of a sand worm, comprising an open ended collapsible sac of substantially oval cross-section and having its opposite end arched so that the extremity thereof lies to one side of the longitudinal axis of the sac, said sac being provided with flexible strands extending outwardly therefrom in simulation of the appearance of a sand worm, an element positioned within the open end of said sac, said element having an opening to freely admit water into the sac at an angle to the axis thereof to cause rotation of the sac, said free end having an opening at its extremity to permit restricted egress of water therefrom and means for drawing said element and sac through the water whereby the water passing through the same will inflate the sac and the water passing through the tip at an angle to the longitudinal axis will cause the sac to be deflected from a straight line of travel.

11. A fishing lure comprising a hollow rubber-like structure adapted to have a line connected thereto to draw the lure through water, said structure being formed by joining together a flat bottom portion and an upper portion of curved cross-section with the area of juncture of both portions forming vanes extending along the opposite sides of the structure, said vanes being serrated in simulation of feelers which may be moved by the water as the structure is drawn therethrough.

JAMES H. HAYES.